Patented Sept. 29, 1953

2,653,900

UNITED STATES PATENT OFFICE 2,653,900

VITAMIN $B_{12}$ PURIFICATION PROCESS

Arnold J. Holland, Penn Laird, Va., assignor to Merck & Co., Inc., Rahway, N. J., a corporation of New Jersey No Drawing. Application June 7, 1951, Serial No. 230,424

7 Claims. (Cl. 167—81)

This invention relates to a procedure for removing impurities from concentrates containing vitamin $B_{12}$ active substances. More particularly, the invention relates to an improved purification procedure wherein a solution containing vitamin $B_{12}$ active substances and contaminants is contacted with zinc hydroxide to remove a substantial portion of the contaminants from such solution.

A number of procedures have been disclosed for recovering concentrates containing vitamin $B_{12}$ active substances from liver and from fermentation products obtained by the fermentation of suitable nutrient media with vitamin $B_{12}$ producing organisms. For example, the preparation of such concentrates from anahaemin, a commercial liver extract, is disclosed in the Journal of Pharmaceutical Pharmacology, 1, 60 (1949), while procedures for obtaining concentrates of vitamin $B_{12}$ active substances from S. Aurofaciens and S. griseus fermentation products are disclosed in the Proceedings of the Society of Experimental Biology and Medicine, 72, 643 (1949) and in U. S. Patent No. 2,530,416. The latter procedures are equally effective in preparing concentrates of vitamin $B_{12}$ active substances from fermentation products obtained in the propagation of Mycobacterium smegmatis, Pseudomonas lumichroma, Alternaria alevaeca, Bacillus megatherium, Alkaligenes faecalis, Streptomyces fradiae, and other vitamin $B_{12}$ producing organisms.

By the term vitamin $B_{12}$ active substances as used herein is meant vitamin $B_{12}$ itself, a compound now recognized to be a cobalt complex containing a characteristic CN group, and closely related cobalt complexes, which may be referred to as vitamin $B_{12}$ analogs, and which differ from vitamin $B_{12}$ in having some other characteristic group or anion in place of the CN group. Concentrates of vitamin $B_{12}$ active substances derived from liver and from fermentation products generally contain one or more of the related complexes or analogs in addition to vitamin $B_{12}$ itself, and it is also possible by chemical reaction to convert vitamin $B_{12}$ to related complexes or analogs. By way of illustration, it has been shown in the Proceedings of the Society for Experimental Biology and Medicine, 72 643 (1949) that a substance referred to as vitamin $B_{12b}$ is present together with vitamin $B_{12}$ in concentrates derived from liver and from fermentation products. This substance now appears to be identical with vitamin $B_{12a}$, the hydroxy analog of vitamin $B_{12}$ which can be prepared by hydrogenation of vitamin $B_{12}$ as disclosed in the Journal of the American Chemical Society, 71, 1514, and which is further described in the Journal of the American Chemical Society, 73, 335–7 (1951), and Science, 112, 354–5 (1950).

Procedures heretofore available for recovering vitamin $B_{12}$ from concentrates containing vitamin $B_{12}$ active substances are complicated and circuitous, generally involving repeated extractions with different solvents, concentration of extracts, countercurrent distribution between different solvents such as water and benzyl alcohol, and repeated precipitation of active substances from solution by means of solvents such as acetone, which are essentially non-solvents for vitamin $B_{12}$, before a sufficiently purified product is obtained to permit the recovery of crystalline vitamin $B_{12}$. In these procedures the problems are multiplied by the presence of vitamin $B_{12}$ analogs due to the solubility characteristics of vitamin $B_{12}$ and its various analogs. It is possible to materially simplify the recovery procedures by treating a concentrate containing vitamin $B_{12}$ active substances with a substance furnishing cyanide ion as disclosed in U. S. Patent No. 2,530,416, to thereby convert all of the active substances to vitamin $B_{12}$. Even when the concentrate contains substantially all of the vitamin $B_{12}$ activity in the form of vitamin $B_{12}$, however, the large amount and complex nature of contaminants present in the concentrate render the recovery procedures circuitous and inefficient.

I have now discovered a new purification procedure which is highly advantageous in the preparation of both purified concentrates of vitamin $B_{12}$ active substances and vitamin $B_{12}$ itself in that it effects in a single step a removal of substantial amounts of contaminants which according to previously known procedures could only be effected by a number of expensive and time consuming extraction, precipitation and chromatographic purification steps. Regarded in certain of its broader aspects, the process in accordance with my invention comprises contacting a solution containing vitamin $B_{12}$ active substances and contaminants with zinc hydroxide and separating the zinc hydroxide containing a substantial portion of said contaminants from a purified residual solution containing vitamin $B_{12}$ active substances.

The degree of purification effected by means of zinc hydroxide depends upon a number of factors including the relative proportion of vitamin $B_{12}$ active substances and contaminants or impurities in the starting concentrate, the nature of the impurities or contaminants which are present, and the manner of treating or contacting the solution with zinc hydroxide. The process can advantageously be employed in treating crude concentrates of vitamin $B_{12}$ active substances wherein the amount of such active substances is within the range of about 0.01 to 25% of the total solids. The process is most advantageously employed, however, with crude concentrates in which the active substances account for only 0.01 to 2.0% of the total solids, and with concentrates of this type five to ten fold increases in purity of the vitamin $B_{12}$ active substances are frequently obtained with a single zinc hydroxide treatment.

The zinc hydroxide purification procedure is equally effective in removing impurities or contaminants from crude concentrates initially derived from liver and from fermentation products as above described, although fermentation products are, of course, recognized as the most advantageous source material for the large scale production of vitamin $B_{12}$ active substances. With either type of starting material, however, the contaminants or impurities comprise a complex mixture of substances including substantial amounts of colored impurities. Zinc hydroxide appears to be particularly effective in removing such colored impurities. In this removal of impurities, zinc hydroxide is unique in its effectiveness. Zinc hydroxide selectively removes impurities while leaving substantially all of the vitamin $B_{12}$ active substances in solution. In this connection, experimentation using radioactive techniques has shown that when zinc hydroxide and adsorbed or occluded impurities are properly washed, no significant amount of vitamin $B_{12}$ active substances can be detected in the zinc hydroxide residue. The selectivity of the action of zinc hydroxide is surprising and unexpected since it is known that vitamin $B_{12}$ active substances are readily adsorbed on materials such as fuller's earth, alumina, magnesol, and bentonite.

It also appears that zinc hydroxide is unique in its effectiveness as compared with other oxides and hydroxides. I have found, for example, that silver oxide and aluminum, nickel, iron, calcium, magnesium and cadmium hydroxides may in some instances remove small amounts of impurities or contaminants, but the amounts removed are not sufficient to effect any practical degree of purification.

In carrying out the new process, a solution of vitamin $B_{12}$ active substances and contaminants or impurities can be contacted with zinc hydroxide in a number of different ways. For example, zinc hydroxide can be added to the solution and thoroughly mixed or agitated therewith and then filtered off to effect the desired separation, or the solution can be passed through a column or bed of zinc hydroxide, preferably deposited on an inert material such as diatomaceous earth. Another and still better procedure, however, is to form and precipitate the zinc hydroxide in the solution by interaction between stoichiometrically equivalent amounts of a water soluble zinc salt and a base.

The term "base" as used herein is intended to have its primary meaning, i. e., a compound which yields hydroxyl ions in aqueous solution. In this modification of the process, any of the common water soluble zincs salts such as zinc chloride, zinc bromide, zinc nitrate, zinc sulfate, and the like, and any of the common water soluble inorganic bases such as ammonium hydroxide, sodium hydroxide, potassium hydroxide and the like can be employed.

When forming the zinc hydroxide in situ, the zinc salt or a solution thereof is preferably first added to the solution containing vitamin $B_{12}$ active substances and contaminants and then while agitating the resulting mixture the required amount of a solution of a base is added. The reverse order of addition can be employed equally well, however, as inorganic bases in the concentration required in the process have no detrimental effect on the vitamin $B_{12}$ active substances. Agitation is preferably continued for a few minutes, i. e., 5 to 10 minutes or longer depending on the quantity, to thoroughly contact the suspended zinc hydroxide thus formed with the solution, and then the zinc hydroxide together with adsorbed and occluded contaminants or impurities is filtered off and the filtrate washed to remove traces of vitamin $B_{12}$ active substances which may be physically retained therein. By thus forming and precipitating zinc hydroxide within the solution of vitamin $B_{12}$ active substances a somewhat greater quantity of contaminants or impurities is removed.

The zinc salt and the base may be conveniently selected so that the salt formed as the second product of the reaction does not interfere with the removal of impurities or with subsequent processing of the residual solution. One of the common water soluble zinc salts and one of the common water soluble inorganic bases are ordinarily employed, to produce as the second product a water soluble salt. Separation of vitamin $B_{12}$ active substances from such a salt is readily accomplished, for example, by extraction of the solution with a suitable organic solvent for vitamin $B_{12}$ active substances such as benzyl alcohol.

The amount of zinc hydroxide employed in the purification process is subject to some variation depending upon the nature of the material treated, i. e., the relative concentration of vitamin $B_{12}$ active substances with respect to the total solids in the starting material. I have found that in most instances the use of about .2 moles of zinc hydroxide per gram of "vitamin $B_{12}$ color" present in the starting material gives very effective purification, although in instances where very impure concentrates are employed, it is preferable to increase this amount to about .3–.5 moles of zinc hydroxide per gram of "vitamin $B_{12}$ color." Conversely, however, if the concentration of vitamin $B_{12}$ active substances is greater than about 5–10% of the total solids in the starting material, 0.1 mole of zinc hydroxide per gram of "vitamin $B_{12}$ color" or even less may be adequate to effect the desired purification.

By "vitamin $B_{12}$ color" is meant the amount of vitamin $B_{12}$ which would exhibit the same intensity of light absorption at a light wave length of 5500Å as does the solution to be treated. 5500Å is selected as being one of the characteristic absorption maxima of vitamin $B_{12}$. Procedures for approximating the amount of vitamin $B_{12}$ active substances present in crude concentrates have been described in United States Patent No. 2,530,416.

While a single treatment with zinc hydroxide in the manner above-described will generally effect the desired amount of purification of the solution of vitamin $B_{12}$ active substances, it is sometimes advantageous, particularly when very large amounts of contaminants or impurities are present to subject the solution to additional zinc hydroxide purification. This may be done by merely repeating the particular procedure initially employed or by combining two or more of the procedures, as for example, by passing the solution through a column of zinc hydroxide supported on an inert carrier to remove part of the impurities, then adding to the effluent solution a soluble zinc salt and a base to form zinc hydroxide in situ, and separating from the solution the zinc hydroxide thus formed together with additional impurities.

The zinc hydroxide purification is effected equally well in water solution and in organic and aqueous-organic solvent solutions. Such solutions may be obtained either in recovery operations designed to secure vitamin $B_{12}$ active substances from a source material, or may be prepared from solid materials or concentrates containing vitamin $B_{12}$ active substances.

The zinc hydroxide purification procedure has an advantageous effect on the so-called benzyl alcohol extraction step which is frequently employed one or more times in recovering vitamin $B_{12}$ active substances in more concentrated form from solutions or concentrates. This extraction involves extraction of an aqueous solution containing vitamin $B_{12}$ active substances with benzyl alcohol, combining the resulting benzyl alcohol extract with a fresh quantity of water, and adding chloroform or carbon tetrachloride to the mixture causing a retransfer of the vitamin $B_{12}$ active substances to water. When tar-forming impurities are present, there is a coprecipitation of tars and vitamin $B_{12}$ active substances during the retransfer from benzyl alcohol to water. By employing the zinc hydroxide purification prior to initial treatment of a concentrate by benzyl alcohol extraction as above described, the tar-forming contaminants are substantially eliminated, thus reducing the loss of active substances in extracting with benzyl alcohol and retransferring to water.

The zinc hydroxide purification is also particularly advantageous in the working up of aqueous-acetone solutions of vitamin $B_{12}$ active substances. Concentration of such solutions to remove acetone often results in a precipitation of tarry impurities with an appreciable loss of vitamin $B_{12}$ active substances through coprecipitation. By employing the zinc hydroxide purification prior to such concentration, this loss of vitamin $B_{12}$ active substances can be substantially eliminated.

Solutions of vitamin $B_{12}$ active substances following the zinc hydroxide treatment can be worked up according to known procedures to prepare concentrates suitable for use as animal feed supplements and, if desired, to recover pure crystalline vitamin $B_{12}$. In instances where zinc hydroxide employed is formed in situ by reaction between zinc salt and a base, the solutions of vitamin $B_{12}$ active substances, after removal of zinc hydroxide, may contain a substantial amount of inorganic salt. This inorganic salt, however, is largely left behind when such solutions are extracted with organic solvents such as benzyl alcohol, cresol-carbon tetrachloride mixtures, and the like, for transfer of the active substances to the organic solvent solution. After such transfer to organic solvent solution, the active substances can be precipitated by addition of solvents such as acetone and ether, or retransferred to an aqueous solution for further processing in accordance with known procedures. The particular manner of processing the vitamin $B_{12}$ active substances following zinc hydroxide treatment will depend upon factors such as the degree of concentration and purification of the active substances which has been attained at the time of zinc hydroxide treatment, and the nature of the product ultimately desired.

The following examples will show how procedures in accordance with the present invention can be carried out, but it is to be understood that these examples are given by way of illustration and not of limitation.

Example 1

A solid concentrate containing about 0.5-1.5% of vitamin $B_{12}$ active substances derived from a fermentation broth produced by fermenting a nutrient medium with *Streptomyces griseus*, is extracted with about 2-2.5 ml. of water per gram of concentrate. The optical density of a sample of the extract is measured at 5500Å, and the result is expressed as grams of vitamin $B_{12}$ required to exhibit the same intensity of absorption, referred to as grams of vitamin $B_{12}$ color.

To the extract is added about 205 ml. of 1 M aqueous zinc chloride solution per gram of vitamin $B_{12}$ color. While agitating the resulting solution, about 68 ml. of 6 N ammonium hydroxide per gram of color is added, and a precipitate of zinc hydroxide forms.

After agitating about five minutes, the zinc hydroxide precipitate is removed by filtration and washed with water until the washes are substantially colorless, and the filtrate and washings are combined. The combined filtrate and washings are found to contain substantially all of the vitamin $B_{12}$ active substances present in the starting concentrate, but materially less impurities, particularly colored impurities, disregarding the ammonium chloride formed. The purification factor is about five-fold.

When the procedure in the foregoing example is repeated employing zinc bromide, zinc nitrate or zinc sulfate in place of zinc chloride and employing sodium hydroxide or potassium hydroxide in place of ammonium hydroxide substantially the same results are obtained. In each instance a four to six fold purification is obtained, i. e., a four to six fold increase in the percent of vitamin $B_{12}$ active substances in the total solids (exclusive of the inorganic salt liberated in the formation of zinc hydroxide).

Example 2

An aqueous concentrate derived from an *S. griseus* fermentation broth and having a total solids content of about 10%, of which solids about 1-1.5% is vitamin $B_{12}$ active substances, is sampled for determination of color content at 5500 Å. To the concentrate is added about 100 ml. of 2 M aqueous zinc chloride solution per gram of vitamin $B_{12}$ color. While agitating the resulting solution, about 66 ml. of 6 N ammonium hydroxide solution per gram of color is added, and a precipitate of zinc hydroxide forms.

The zinc hydroxide precipitate is removed by filtration and washed with water until the washes are substantially colorless. The filtrate and washings are combined to provide a purified solution of vitamin $B_{12}$ active substances.

Example 3

A water acetone solution (2-3 by volume) obtained in processing a fermentation product is found to have a total solids content of about 4%, of which solids about 1-1.5% is vitamin $B_{12}$ active substances. To this solution is added about 100 ml. of a 2 M aqueous zinc chloride solution per gram of "vitamin $B_{12}$ color" and while agitating the resulting solution about 66 ml. of a 6 N ammonium hydroxide solution per gram of "vitamin $B_{12}$ color" is added. The agitation is continued for about five minutes and the precipitate of zinc hydroxide and adsorbed or occluded impurities is then filtered off and washed with water until the washes are substantially colorless. The combined filtrate and washings are then concentrated to about ⅓ volume in a long tube evaporator under reduced pressure and at a temperature below about 45° C. to remove the acetone. It is found that this concentration is effected without the separation of any appreciable amount of tarry residue and a determination of vitamin $B_{12}$ active substances indicates that the concentrated solution contains substantially all of the active substances present in the starting water-acetone solution.

*Example 4*

A quantity of an aqueous concentrate of vitamin $B_{12}$ active substances of the type employed in Example 2 is divided into three equal parts each containing 5.7 g. of total solids and 105 mg. of total color measured at 5200 Å. and calculated for vitamin $B_{12a}$ by $$E_{1\ cm.}^{1\%} = 58$$

Each part is treated separately with zinc hydroxide in accordance with the following procedures, the amount of zinc hydroxides in each instance being approximately 0.2 moles per gram of "vitamin $B_{12a}$ color":

(a) To part 1, zinc chloride and ammonium hydroxide solutions in required amounts are added with agitation as described in Example 2, and the precipitate of zinc hydroxide which forms is filtered off and washed. The resulting solution contains 16.7 mg. of total color measured at 5200 Å.

(b) To part 2, a suspension of the required amount of zinc hydroxide in water is added, and the resulting mixture is agitated and then filtered to remove the zinc hydroxide and adsorbed or occluded impurities. The resulting solution contains 22.6 mg. of total color measured at 5200 Å.

(c) The third part is passed through a column containing the required amount of zinc hydroxide precipitated on a diatomaceous earth filter aid. The column is washed with water and the effluent solution and washings are collected until no appreciable amount of color remains in the effluent. The resulting solution contains 33 mg. of total color measured at 5500 Å.

In each of the procedures (a), (b) and (c), (wherein the same amount of zinc hydroxide is employed), a substantial, purification of the vitamin $B_{12}$ active substances is effected, and by separate assay it is found that the vitamin $B_{12}$ activity prior to treatment, and after the three treatments remain substantially the same. While the results are satisfactory in all cases, the greatest amount of purification appears to be obtained using procedure (a), and the next highest purification is effected when using procedure (b).

*Example 5*

Eleven different aqueous vitamins $B_{12}$ concentrates obtained in commercial operation are assayed for vitamin $B_{12}$ content employing radioactive vitamin $B_{12}$ as a tractor. Each concentrate is then purified by zinc hydroxide treatment employing the same procedure involving formation of the zinc hydroxide in situ by reaction between zinc chloride and ammonium hydroxide. The precipitated zinc hydroxide in each instance is filtered off and washed and the combined filtrate and washes from each starting concentrate and the zinc hydroxide precipitate from each starting concentrate are assayed for vitamin $B_{12}$ content. These assays show that vitamin $B_{12}$ recovery in the filtrates is in all cases between 95 and 100%, and these results are substantiated by the assays of the precipitate which show that only minute traces of vitamin $B_{12}$ remain therein.

*Example 6*

A quantity of an aqueous acetone solution of vitamin $B_{12}$ is withdrawn from commercial operations in production of vitamin $B_{12}$ and adjusted to a pH of about 7 and assayed for vitamin $B_{12}$ content. The solution is then purified by zinc hydroxide treatment forming the zinc hydroxide in situ by reaction between zinc chloride and ammonium hydroxide. After removal of the zinc hydroxide precipitate, the residual solution is concentrated to remove acetone and again assayed for vitamin $B_{12}$ content. The vitamin $B_{12}$ recovery is found to be about 93%. A quantity of the same starting aqueous acetone solution is neutralized as above-described, concentrated to remove acetone and then purified with zinc hydroxide in the manner above-described. After filtering off the zinc hydroxide precipitate, the filtrate is assayed for vitamin $B_{12}$ content showing vitamin $B_{12}$ recovery of only about 76%. The loss of vitamin $B_{12}$ is due to a formation of tarry materials during concentration and coprecipitation of vitamin $B_{12}$ with the tarry materials during the zinc hydroxide treatment.

A repetition of the foregoing comparison with a different batch of aqueous acetone solution of vitamin $B_{12}$ results in a vitamin $B_{12}$ recovery, when zinc hydroxide treatment is carried out before concentration, of nearly 100% as compared with a recovery of about 65% when zinc hydroxide treatment is carried out after concentration.

*Example 7*

An aqueous concentrate of vitamin $B_{12}$ active substances withdrawn from commercial operations is found to have about 680 mg. of vitamin $B_{12a}$ color measured at 5200 A.;

$$E_{1\ cm.}^{1\%} = 58$$

("Vitamin $B_{12a}$ color" is determined at 5200 Å., at about which point vitamin $B_{12}$ analogs exhibit absorption maxima of comparable intensities and the absorption of vitamin $B_{12}$, although not maximal, is of the same order of intensity. Color readings at this wave length appear to be about as satisfactory as those at 5500 Å. for calculation of zinc hydroxide requirements.) The concentrate is further found to contain about 250 gm. of total solids, of which about 0.1% is vitamin $B_{12}$ active substances.

To one 2000 ml. quantity of the concentrate is added about 120 gm. of sodium sulfate, and the mixture is stirred to complete solution. The solution is then extracted three times with 200 ml. of benzyl alcohol each time, and the extracts are combined. To the extracts are added 60 ml. of water and 600 ml. of carbon tetrachloride. The resulting mixture is agitated for about 5 minutes, allowed to settle, and the phases are separated. The organic phase is further extracted twice with 60 ml. of water each time, and the aqueous extracts containing vitamin $B_{12}$ active substances are combined. Considerable tar formation occurs during this transfer of active substances from benzyl alcohol to water.

To a second 2000 ml. quantity of the concentrate is added 100 ml. of 2M aqueous zinc chloride solution, and, while stirring, the pH of the solution is raised to 6.9 to 7.0 with about 150–200 ml. of 6% aqueous sodium hydroxide solution. About 120 gm. of sodium sulfate is added, and the solution is stirred to effect solution. Diatomaceous earth filter aid, about 25 gm., is added, the mixture is filtered, and the filter cake is washed with about 500 ml. of water. The filtrate and washes are combined and extracted three times with 200 ml. of benzyl alcohol each time, and the extracts are combined. The vitamin $B_{12}$ active substances are then extracted into water with the aid of carbon tetrachloride, as described above for the first quantity of concentrate. No tar formation occurs during this transfer of active substances from benzyl alcohol to water.

Various changes and modifications in the foregoing procedures will occur to those versed in the art, and to the extent that such changes and modifications are within the purview of the appended claims, it is to be understood that they constitute part of my invention.

I claim:

1. The process that comprises reacting together within an aqueous solution which contains a vitamin $B_{12}$ active substance and contaminants approximately stoichiometrically equivalent amounts of a soluble zinc salt and a water soluble inorganic base, and agitating said solution to maintain the zinc hydroxide thus formed in a state of suspension, and then separating the zinc hydroxide together with adsorbed and occluded contaminants from a residual solution containing said vitamin $B_{12}$ active substance.

2. The process that comprises contacting an aqueous solution containing a vitamin $B_{12}$ active substance and contaminants, wherein said vitamin $B_{12}$ active substance comprises at least 0.01% of the total solids, with zinc hydroxide, and separating the zinc hydroxide containing a substantial portion of said contaminants from a purified residual solution containing said vitamin $B_{12}$ active substance.

3. The process that comprises contacting an aqueous solution containing a vitamin $B_{12}$ active substance and contaminants with zinc hydroxide in an amount equivalent to about 0.1 to 0.5 moles per gram of vitamin $B_{12}$ color as determined by absorption of light having a wave length of 5500 Å., and separating the zinc hydroxide containing a substantial portion of said contaminants from a purified residual solution containing said vitamin $B_{12}$ active substance.

4. The process that comprises contacting an aqueous solution containing a vitamin $B_{12}$ active substance and contaminants, wherein said vitamin $B_{12}$ active substance comprises at least 0.01% of the total solids, with zinc hydroxide in an amount equivalent to about 0.1 to 0.5 moles per gram of vitamin $B_{12}$ color as determined by absorption of light having a wave length of 5500 Å., and separating the zinc hydroxide containing a substantial portion of said contaminants from a purified residual solution containing said vitamin $B_{12}$ active substance.

5. The process that comprises contacting an aqueous solution containing a vitamin $B_{12}$ active substance and contaminants with zinc hydroxide and separating the zinc hydroxide containing a substantial portion of said contaminants from a purified residual solution containing said vitamin $B_{12}$ active substance.

6. The process as defined in claim 5 wherein the starting solution is a water solution of said vitamin $B_{12}$ active substance and contaminants.

7. The process as defined in claim 5 wherein the starting solution is an aqueous-acetone solvent solution of said vitamin $B_{12}$ active substance and contaminants.

ARNOLD J. HOLLAND.

References Cited in the file of this patent

UNITED STATES PATENTS

| Number | Name | Date |
|---|---|---|
| 2,530,416 | Wolf | Nov. 21, 1950 |

FOREIGN PATENTS

| Number | Country | Date |
|---|---|---|
| 590,956 | Great Britain | Aug. 1, 1947 |

OTHER REFERENCES

Fantes—Proceedings of the Royal Society (1950) page 596.